United States Patent [19]

Michimasa

[11] Patent Number: 5,299,547
[45] Date of Patent: Apr. 5, 1994

[54] INTAKE AIR FLOW INCREASING DEVICE FOR COMBUSTION ENGINE

[76] Inventor: Sandou Michimasa, 2-2682-5, Hishi-Machi, Kiryu-Shi Gunma-Ken 376, Japan

[21] Appl. No.: 868,944

[22] Filed: Apr. 15, 1992

[51] Int. Cl.⁵ ............................................. F02B 33/00
[52] U.S. Cl. ................................. 123/559.1; 60/611; 123/564
[58] Field of Search ............... 123/559.1, 564; 60/600, 60/601, 611

[56] References Cited

U.S. PATENT DOCUMENTS

| | | | |
|---|---|---|---|
| 3,020,901 | 2/1962 | Cook | 123/559.1 |
| 4,928,648 | 5/1990 | Schatz et al. | 123/559.1 |
| 5,064,423 | 11/1991 | Lorenz et al. | 60/611 |

FOREIGN PATENT DOCUMENTS

| | | | |
|---|---|---|---|
| 56-154126 | 11/1981 | Japan . | |
| 7711822 | 5/1979 | Netherlands | 60/611 |

*Primary Examiner*—Richard A. Bertsch
*Assistant Examiner*—Charles G. Freay
*Attorney, Agent, or Firm*—Ladas & Parry

[57] ABSTRACT

In an intake air flow increasing device for a combustion engine according to this invention, an air exhausting body is provided forward of an air intake opening, and the air exhausting body is connected to a main compressed air conducting path and an auxiliary compressed air conducting path, while each of the compressed air conducting paths is connected to an air compressing mechanism via a main switching control valve and an auxiliary switching control valve respectively. The main switching control valve is opend and closed according to switching operations of a speed change mechanism when a vehicle is accelerated. The auxiliary switching control valve can work independently from opening/closing operations of the main switching control valve. Thus an enough quantity of intake air required for combustion in the diesel engine can be supplied, in addition, power performance of the combustion engine is ensured regardless of running conditions or heavy things loaded on a vehicle.

9 Claims, 2 Drawing Sheets

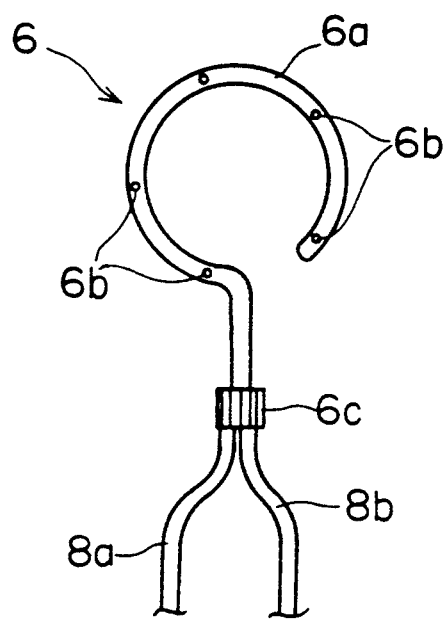
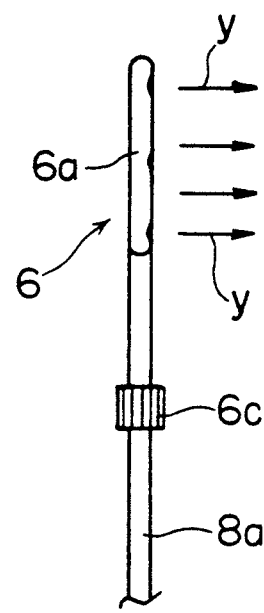
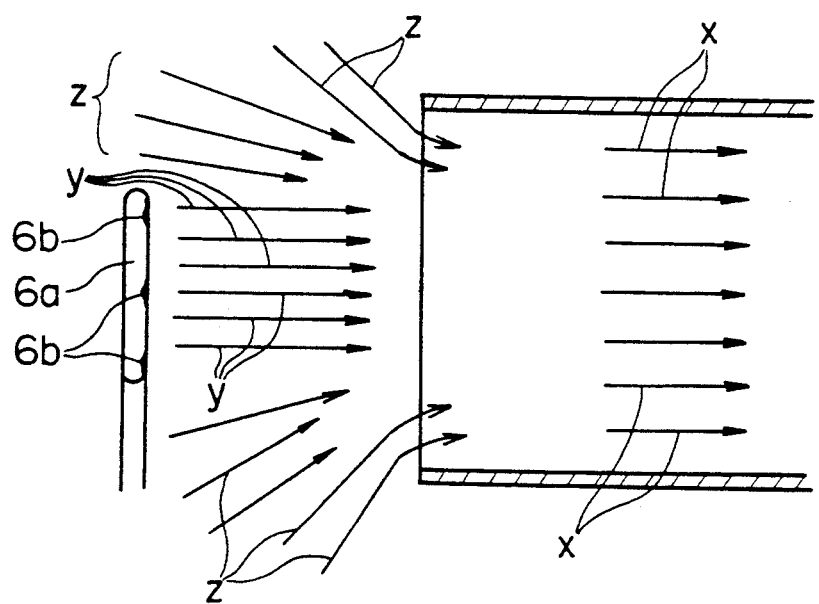

3,299,547

INTAKE AIR FLOW INCREASING DEVICE FOR COMBUSTION ENGINE

FIELD OF THE INVENTION

This invention relates to a combustion engine to be mounted in a vehicle such as a truck or a passenger car, and more particularly to an intake air flow increasing device for a combustion engine, in which power performance of the combustion engine can be improved by improving the combustion efficiency while preventing exhaustion of harmful substances by suppressing generation of black smoke generated in a combustion chamber.

PRIOR ART

A combustion engine is commonly mounted in a vehicle such as a truck, or a passenger car. The gasoline-powered combustion engine contains a mixture of natural intake air and fuel in a carburetor, this mixture of air and fuel is then introduced into a combustion chamber which causes an explosion. The energy generated from the explosion causes a piston to move up and down. In a diesel-powered combustion engine, compressed intake air is sent into a combustion chamber and is compressed to a much higher compression ratio. Fuel is then sprayed to the compressed intake air for combustion of the fuel by making use of heat generated from a higher compression ratio to ignite spontaneously, thus, causes a piston to move up and down.

In recent years, in order to achieve combustion efficiency and acceleration of speed, a supercharger, such as a turbocharger, is widely used in conjunction with a combustion engine.

However, the conventional supercharger, such as a turbocharger, has a rotary turbine and a blower which utilizes exhaust gases generated from the internal combustion engine. When a gas pedal is depressed, the blower becomes disabled, thus, in order to accelerate the vehicle while the vehicle is in operation, a small period of time delay between treading the gas pedal and the acceleration occurs unless and until there is an increase in a rotational speed of the engine to generate a sufficient amount of the exhaust gas. The advantage of this type of device is its ability to maintain a higher rotational speed when the vehicle is operating at a higher speed, however, the following disadvantage occurs when the vehicle is operating at a lower speed.

When the vehicle is operating at a lower speed, the acceleration pedal and the brake pedal are frequently used in turn, thus, when an acceleration pedal is depressed, the pedal may resume its original position before the device starts working. Consequently, this type of device does not work well when the vehicle is operating under a lower speed.

Further, when acceleration and braking are frequently used successively, the quantity of unburnt fuel increases in association with incomplete combustion. Consequently, this results in an increase of black smoke exhaust produced which could cause serious environmental problems.

SUMMARY OF THE INVENTION

An object of this invention is to provide an intake air flow increasing device to solve the problem of incomplete combustion in conventional types of combustion engines.

A main object of this invention is to provide an intake air flow increasing device for a combustion engine, regardless of its engine type and displacement engine which is capable of maintaining a constant combustion state and improving the combustion efficiency during acceleration of the vehicle which minimizes the production of black smoke in order to maintain good environmental conditions.

A further object of this invention is to provide an intake air flow increasing device for a combustion engine capable of improving combustion efficiency during acceleration regardless of heavy load or running uphill.

In this invention, an air exhausting body of compressed air is provided forward of an air intake, and a main conducting path for compressed air and an auxiliary conducting path for compressed air both of which are connected to a compressed air discharge opening connected to the air exhausting body. A main control valve and an auxiliary control valve are provided between the compressed air discharge opening and the main conducting path and the auxiliary conducting path respectively. The main control valve can be opened or closed in accordance with operation of a clutch pedal while the auxiliary control valve can work independently from operations of the aforesaid main control valve.

With this configuration, when a vehicle is accelerated while running on flat ground, shortage of intake air is made up for by a mixture of compressed air jetted from the main conducting path and intake air which is swallowed up by compressed air. In addition, whenever a vehicle carries a heavy load or is moving uphill, a decrease in an absolute intake volume inevitably occurs in the front side of the vehicle due to a reduction in the vehicle's running speed. This decrease can be compensated for by compressed air generated from the auxiliary conducting path. Furthermore, combustion and expansion actions in the engine suited for accelerating as well as carrying a heavy load can be maintained in a stable state. Also, black smoke generated from the exhaust can be minimized in order to improve environmental conditions. The foregoing advantages can be realized regardless of whether a vehicle is burdened with a heavy load or accelerating uphill without adversely affecting any additional devices such as a turbo system.

BRIEF DESCRIPTION OF THE DRAWINGS

FIG. 2(a) is an enlarged front view of an air exhausting body.

FIG. 2(b) is an enlarged side view of an air exhausting body.

FIG. 3 is a drawing showing an intake air flow of compressed air and natural intake air.

DETAILED DESCRIPTION OF THE PREFERRED EMBODIMENTS

Figure 1:
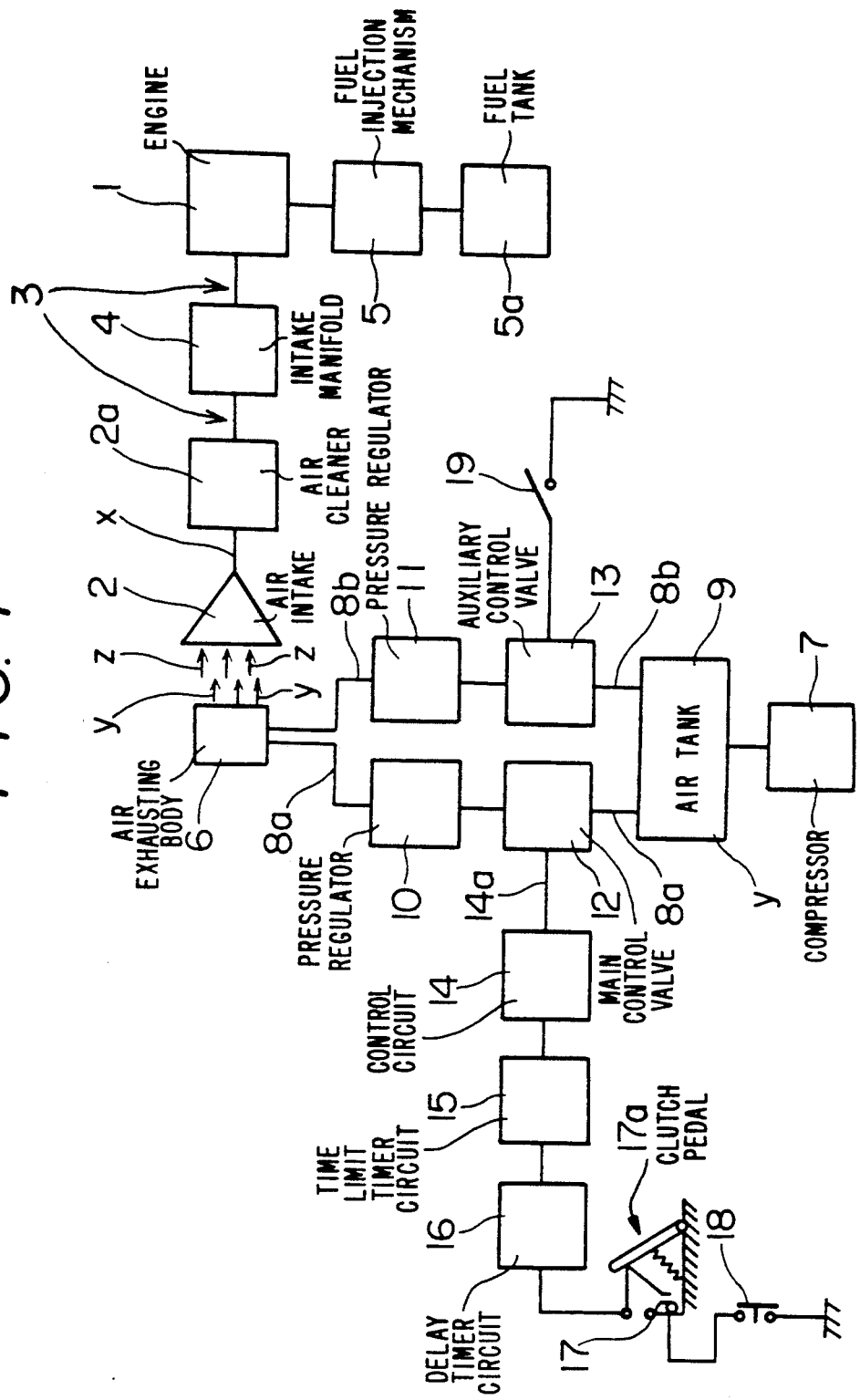
FIG. 1 is a block diagram showing key elements.

To describe this invention in greater detail, preferred embodiments of this invention will now be described in relation to a diesel engine as a preferable example of a combustion engine with reference to the accompanying drawings.

Referring to FIGS. 1 and 2, the reference numeral 1 denotes a diesel engine mounted in an engine compartment of a vehicle. In the diesel engine 1, intake air x is introduced from an air intake opening 2 with an air cleaner 2a arranged therein into a combustion chamber (not shown) via an intake manifold 4 of the diesel engine 1 provided in an intake air conducting path 3 and compressed in the chamber. Fuel is supplied from a fuel tank 5a and sprayed into the intake air x in the combustion chamber by a fuel injection mechanism 5. Combustion and expansion are effected by the compression heat of said intake air x.

An air exhausting body 6 is provided upstream from the air intake 2, and compressed air y produced by an air compressor 7 is jetted from the air exhausting body 6 toward the air intake opening 2.

The air exhausting body 6 has a ring-shaped portion 6a with a plurality of air exhaust nozzles 6b being arranged therein with a constant spacing. The air exhausting body 6 is connected to a main compressed air conducting path 8a and an auxiliary conducting path 8b for compressed air conducting path 8a and an auxiliary conducting path 8b for compressed air y via a connector 6c whereby a discharge side of aforesaid conducting paths are united. A main control valve 12 and an auxiliary valve 13 are provided between each conducting path 8a, 8b and an air tank 9 of an air compressor 7. A pressure regulator 10, 11 is provided in the main compressed air conducting path 8a and the auxiliary compressed air conducting path 8b respectively. The pressure of the compressed air y in a main conducting path 8a is maintained at a higher level than that of the auxiliary conducting path 8b by pressure regulators 10, 11.

The main control valve 12 is opened or closed in response to a control signal 14a transmitted from a control circuit 14 to discharge the compressed air from the compressed air tank 9 or stop the discharge. A clutch switch 17 and a brake switch 18 are serially connected via a time limit timer circuit 15 and a delay timer circuit 16 to the aforesaid control circuit 14.

The clutch switch 17 and the brake switch 18 open or close in response to a driver stepping on a clutch pedal 17a and a brake pedal (not shown) of the vehicle. The clutch switch 17 comprises a normally open contact, while the brake switch 18 comprises a normally closed contact. When the clutch is operated while the vehicle is running, the clutch switch 17 is closed so that a low level signal is sent to the delay timer circuit 16. When the brake pedal is depressed, the brake switch 18 is opened so that transmission of the low level signal is suppressed regardless of whether the aforesaid clutch switch 17 has been opened or closed.

On the other hand, a lever switch 19 provided in the driving control section of the vehicle is connected to the auxiliary control valve 13 of the auxiliary conducting path 8b, so that the auxiliary control 13 may be opened for a certain period of time by operation of the lever switch 19.

In the above configuration, when the clutch pedal 17a is depressed and the speed change mechanism not shown is kept in a switching-ready state, the clutch switch 17 is closed and the low level signal is sent to the delay timer circuit 16. Then, the aforesaid low level signal is delayed by a specified period of time t1 in the delay timer circuit 16, to permit the driver to change gears while depressing the clutch pedal 17a and a speed-change lever is effected within this specified time t1. Then, the low level signal is kept in a low level state by the time limit timer by a specified period of time t2 and then sent to the control circuit 14. In the control circuit 14, the low level signal is converted to a control signal 14a to keep the control valve 12 in an open state for the specified period of time t2. Thus, the compressed air y being discharged from the compressed air tank 9 to the air intake 2 through the air exhausting body.

At that time, an air z intaking from the air intake 2 due to negative pressure generated by downward movement of the piston (not shown) of the engine 1 is swallowed up to the compressed air y which is at an extremely high speed, so that a large quantity of the intake air x is introduced to the combustion chamber of the engine 1. Thus, when the fuel injection rate increases in accordance with the operation to tread the acceleration pedal is sprayed to the combustion chamber, combustion and expansion are effected by the compression heat of the intake air x.

Consequently, since the air intake flow increases due to increase of the compressed air y in association with an increase of the injection rate of fuel, generation of unburnt fuel is suppressed in the combustion process, so that a quantity of unburnt fuel discharged as black smoke decreases, and black smoke discharged to outside of the vehicle becomes invisible.

When the vehicle must climb an incline or carry a heavy load, the torque required from the engine 1 is higher than usual and the acceleration of the vehicle suffers. The absolute volume of the intake air x decreases, due to reduction of the speed of the engine, while the amount of injected fuel increases, due to the driver depressing the acceleration pedal. As a result, the combustion in the engine 1 is incomplete and a quantity of unburnt fuel exhausted by the vehicle temporarily increases.

In this case, by setting the lever switch 19 provided in the driving control section of the vehicle in a closed position, the auxiliary control valve 13 of the auxiliary conducting path 8b is opened, and because of the compressed air y injected through the auxiliary conducting path 8b, a quantity of the intake air x from the air intake 2 increases. Thus, shortage of the intake air x due to loading the engine is supplemented and combustion and expanding actions in the engine 1 are effected in a good balance. Incomplete combustion is eliminated, thus permitting suppression of the exhaust of harmful substances.

It is to be noted that, although the above description concerns the air exhausting body 6 having a ring-shaped portion 6a with exhausting nozzles being arranged therein with a constant interval, this type of air exhausting body is adapted for a vehicle with a large displacement engine, namely for a vehicle which requires a large amount of intake air. Thus, in case of a vehicle with a small displacement, the same effects can also be obtained with a cylindrical air exhausting body being arranged therein with air exhausting nozzles 6b.

Also, it is to be noted that, the same effects can also be obtained in a case of a gasoline engine by arranging the carburetor at a middle point of the path from the compressed air conducting path 3 and the intake manifold 4, so that enough intake air flow is ensured, even if supply of fuel to a carburetor is made suddenly in response to the depressing of the acceleration pedal for accelerating the vehicle.

As clearly shown in the above description, according to this invention, the following effects can be achieved.

(1) According to this invention, an intake air flow into an engine can be increased without adversely affecting operations of additional devices such as a turbocharger, responsiveness of an air charging function is improved, and at the time of accelerating the vehicle, combustion and expansion actions in the engine can be made in a stable state in accordance with conditions such as carrying a heavy load or traveling on an incline so that power performance of the engine can be increased by improving the combustion efficiency. At the same time, the intake air flow increasing device of this invention is easily mounted on the vehicle without any complicated arrangement of conventional intake systems. Thus, with cheaper cost, the intake system is greatly improved.

(2) Since the discharge side of the main conducting path and the auxiliary conducting path are united so that single air exhausting body is connected to the discharge side of the conducting path, stable power performance of an engine can always be drawn forth by supplying compressed air from the auxiliary conducting path even under the running conditions where it is difficult to make up for shortage of intake air flow rate only with compressed air from the main compressed air conducting path.

(3) Since the air compressing adjustment keeps a pressure of compressed air in the conducting path at an appropriate level in accordance with the vehicle's displacement or types of an engine, the intake air flow increasing device of this invention can be utilized for various types of vehicles.

(4) Since the air exhaust nozzles of the air exhausting body face the air intake side and compressed air can be supplied at an extremely high speed, the amount of natural intake air swallowed up to compressed air increases so that a large amount of intake air can be supplied to the engine timely.

(5) Since the air exhausting body is made to have a ring-shaped portion with air exhausting nozzles, increase of the intake air flow is achieved smoothly without interrupting the flow of natural intake air.

INDUSTRIAL UTILITY

As the intake air flow increasing device for a combustion engine according to this invention can maintain a stable combustion state and improve the combustion efficiency when accelerating a vehicle, regardless of heavy things loaded on the vehicle or running conditions such as running uphill, it can be used in all vehicles with a combustion engine mounted therein.

What is claimed is:

1. An intake air flow increasing device for a combustion engine, comprising:
   a main compressed air conducting path linked to a compressed air discharge opening of a compressed air tank via a main control valve wherein said main control valve is opened and closed according to operation of a speed change mechanism;
   an auxiliary compressed air conducting path linked to said compressed air discharge opening via an auxiliary control valve wherein said auxiliary control valve operates independently of opening and closing operations of said main control valve;
   a pressure regulator means for adjusting pressure of compressed air being provided in said main compressed air conducting path and said auxiliary compressed air conducting path; and
   air exhausting body connected to a discharge side of each said compressed air conducting path and being provided forward of an intake air opening connected to an air cleaner, and said air exhausting body having air exhaust nozzles facing said intake air opening.

2. An intake air flow increasing device for a combustion engine comprising:
   a main compressed air conducting path linked to a compressed air discharge opening of a compressed air tank via a main control valve wherein said main control valve is opened and closed according to operation of a speed change mechanism;
   an auxiliary compressed air conducting path linked to said compressed air discharge opening via an auxiliary control valve wherein said auxiliary control valve operates independently of opening/closing operations of said main control valve;
   at least one pressure regulator means adjusting pressure of compressed air being provided in said main compressed air conducting path and said auxiliary compressed air conducting path;
   a discharge side of said main compressed air conducting path and a discharge side of said auxiliary conducting path being united; and
   an air exhausting body being connected to a discharge side of said united compressed air conducting path and being provided forward of an intake air opening connected to an air cleaner, and said air exhausting body having air exhaust nozzles facing said intake air opening.

3. The intake air flow increasing device for a combustion engine according to claim 1, wherein at least one of said air exhausting body is made to have a ring-shaped portion with said air exhaust nozzles therein.

4. The intake air flow increasing device for a combustion engine according to claim 2, wherein said air exhausting body is made to have a ring-shaped portion with said air exhaust nozzles therein.

5. The device claim 1 wherein said speed change mechanism comprises a clutch mechanism.

6. The device of claim 2 wherein said speed change mechanism comprises a clutch mechanism.

7. An intake air flow increasing device for a combustion engine for a vehicle, comprising:
   a compressed air tank;
   a compressed air conducting path linked to a compressed air discharge opening of said compressed air tank via a main control valve, wherein said control valve is opened and closed responsive to a speed change mechanism; and
   an auxiliary compressed air conducting path linked to said compressed air discharge opening via an auxiliary control valve, wherein said auxiliary control valve is independently operable with respect to opening and closing operations of said main control valve.

8. The device of claim 7, further including at least one air exhausting body connected to a discharge side of each said compressed air conducting path, said body being provided forward of an intake air opening for said vehicle.

9. The device of claim 7 wherein said main control valve is responsive to operation of a clutch mechanism.

* * * * *